United States Patent
Guinart

(10) Patent No.: US 9,459,275 B2
(45) Date of Patent: Oct. 4, 2016

(54) METHOD OF SAMPLING ACCELERATION MEASUREMENTS OF A MOTOR VEHICLE WHEEL

(75) Inventor: Nicolas Guinart, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 659 days.

(21) Appl. No.: 13/825,677

(22) PCT Filed: Oct. 8, 2010

(86) PCT No.: PCT/FR2010/000678
§ 371 (c)(1),
(2), (4) Date: Mar. 22, 2013

(87) PCT Pub. No.: WO2012/045917
PCT Pub. Date: Apr. 12, 2012

(65) Prior Publication Data
US 2013/0179113 A1    Jul. 11, 2013

(51) Int. Cl.
*B60C 23/04*     (2006.01)
*G01P 15/16*     (2013.01)

(52) U.S. Cl.
CPC ......... *G01P 15/165* (2013.01); *B60C 23/0416* (2013.01); *B60C 23/0488* (2013.01); *B60C 23/0489* (2013.01); *B60C 23/04* (2013.01); *B60C 23/0479* (2013.01)

(58) Field of Classification Search
CPC combination set(s) only.
See application file for complete search history.

(56) References Cited

U.S. PATENT DOCUMENTS

| 6,112,587 A | 9/2000 | Oldenettel |
| 6,204,758 B1 | 3/2001 | Wacker |

(Continued)

FOREIGN PATENT DOCUMENTS

| CN | 101432155 A | 5/2009 |
| DE | 10 2004 042191 | 2/2006 |

(Continued)

OTHER PUBLICATIONS

International Search Report dated Jun. 8, 2011, corresponding to PCT/FR2010/000678.
Chinese Office Action dated Jan. 26, 2015, for corresponding patent application.

*Primary Examiner* — Huan Tran
(74) *Attorney, Agent, or Firm* — Young & Thompson

(57) ABSTRACT

A method of sampling acceleration measurements of a wheel (10, 20, 30, 40) of a motor vehicle (1), the vehicle (1) having a tire pressure monitoring system, and being fitted with an electronic central unit (2), each of the wheels (10, 20, 30, 40) including: a wheel unit (A, B, C, D) fixed to a rim (J10, J20, J30, J40) of radius R and having at least one accelerometer, measuring the radial acceleration $F_1$ of the wheel, and a microprocessor; the method including the measurement, for each wheel revolution, at given time intervals ($T_{measurement}$), of a number (N) of radial acceleration values by the radial accelerometer. The method proposes: that a minimum number (N) of acceleration measurements be fixed per wheel revolution, and that the time intervals ($T_{measurement}$) between two radial acceleration measurements be determined by element of the following relation:

$$T_{measurement} = \frac{2\pi \cdot \sqrt{\frac{R}{F_1}}}{N}$$

11 Claims, 3 Drawing Sheets

(56) References Cited

U.S. PATENT DOCUMENTS

Figure 1:
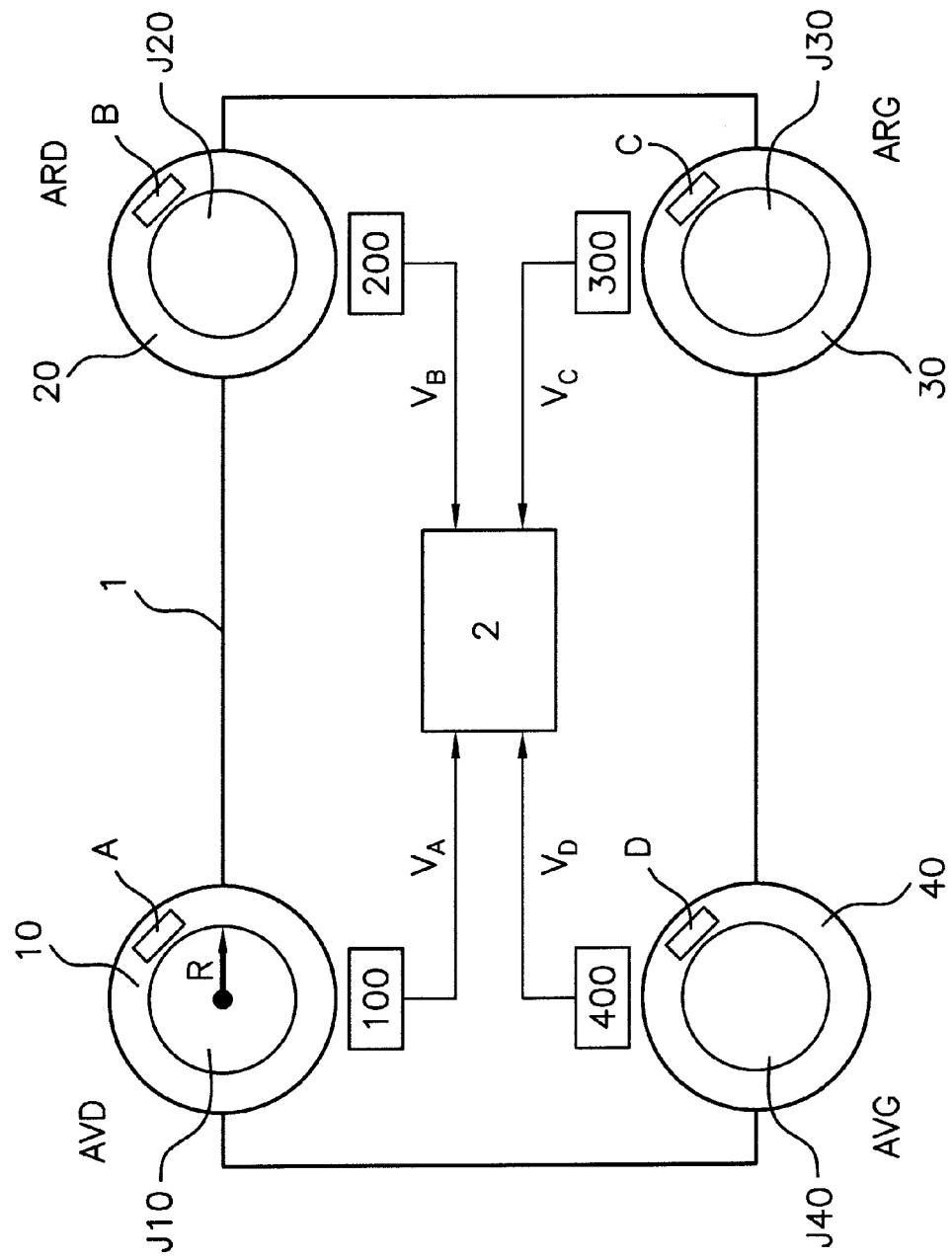

| | | |
|---|---|---|
| 6,435,020 B1 | 8/2002 | Oldenettel et al. |
| 8,165,842 B2 * | 4/2012 | Helck .......................... 702/148 |
| 2005/0156722 A1 | 7/2005 | McCall |
| 2006/0044125 A1 | 3/2006 | Pierbon |
| 2006/0161327 A1 | 7/2006 | Emmerich et al. |
| 2010/0274441 A1 * | 10/2010 | Carresjo ........................ 701/33 |

FOREIGN PATENT DOCUMENTS

| | | |
|---|---|---|
| DE | 10 2005 002240 | 7/2006 |
| EP | 1 693 231 | 8/2006 |
| FR | 2 847 667 | 5/2004 |
| FR | 2 879 750 | 6/2006 |
| WO | 2006100577 A1 | 9/2006 |
| WO | 2009070064 A1 | 6/2009 |

* cited by examiner

METHOD OF SAMPLING ACCELERATION MEASUREMENTS OF A MOTOR VEHICLE WHEEL

The invention relates to a method of sampling acceleration measurements of a wheel of a motor vehicle fitted with a tire pressure monitoring system.

It is increasingly common for motor vehicles to have tire pressure monitoring systems for safety purposes, each of these systems having sensors mounted on each of the wheels of the vehicle, the sensors being used for measuring parameters such as the pressure and/or temperature of the tires fitted on these wheels, with the aim of informing the driver of any abnormal variation in the measured parameter.

These monitoring systems are usually provided on one hand with electronic modules (also called wheel units) mounted on each wheel of the vehicle, incorporating a microprocessor, a radio frequency (RF) transmitter and an LF (low frequency) antenna in addition to the aforesaid sensors, each system also on another hand having a central unit (mounted on the vehicle) for receiving the signals sent by the transmitters, including an electronic computer incorporating a radio frequency receiver connected to an antenna.

In these monitoring systems, each signal received by the receiver of the central unit has to be associated with a data element concerning the location of the transmitting electronic module, and consequently that of the wheel from which this signal originated. This requirement remains present throughout the life of the vehicle, and must therefore be complied with even after wheel changes or, more simply, after the reversal of the wheel positions.

A number of methods for determining the locations of wheels on a vehicle are available at the present time. Thus, for example, it is possible to use three low frequency (LF) radio antennae for this purpose, located in the proximity of the wheel units, with one of these antennae being in the handle of the driver's door, one in the handle of the passenger door, and one in the handle of the trunk of the car.

The central unit sends low frequency signals to each of these antennae in succession, in order to excite them. According to this procedure, the electronic module mounted on the wheel in the proximity of the excited antenna sends an answering signal to the central unit, including an identification code of said module, so that the successive excitation of the three antennae results in the location of the three electronic modules mounted on the wheels adjacent to these antennae, and, by deduction, the location of the fourth module.

However, this location system is relatively costly and complex, as it requires three LF antennae.

Another system for locating the wheels of a vehicle, which requires no additional LF antennae, can be used in vehicles having ABS ("AntiBlockierSystem" in German, or Anti-lock Braking System) sensors, and consists in fitting each wheel unit with a radial acceleration sensor.

As shown in FIG. 1, a vehicle 1, fitted with an ABS system and a tire pressure monitoring system, includes:
for the ABS system: ABS sensors 100, 200, 300 and 400, positioned facing each of the wheels 10, 20, 30 and 40 of the vehicle 1, measuring the rotation speed of each of these wheels $V_A$, $V_B$, $V_C$ and $V_D$, and linked to a central unit 2 by a CAN ("Control Area Network", or serial system bus) network;
for the tire pressure monitoring system: wheel units A, B, C and D, positioned on each rim J10, J20, J30 and J40 with a radius R of the wheels 10, 20, 30 and 40, measuring the radial acceleration of these wheels and linked by RF to the central unit 2.

The ABS sensor positioned facing the wheel identifies each tooth of a toothed target positioned on the wheel, the teeth being equidistant and therefore representing the angular position of the wheel at a given instant.

The wheel unit transmits, at a fixed position on the wheel, a signal intended for the central unit.

The wheels 10, 20, 30 and 40 fitted on the same vehicle 1 do not all rotate at the same speed $V_A$, $V_B$, $V_C$ and $V_D$, the speed depending primarily on the trajectory of the vehicle 1 (for cornering in the present case), but also on the wear and pressure of the tires, as well as on slipping effects (in braking and/or acceleration). Consequently the initial fixed transmission position of the wheel unit becomes offset for each wheel after several wheel revolutions.

By correlating the angular position of the wheel, supplied by the ABS sensor, with the moment when the wheel unit transmits, the central unit 2 deduces from this the transmission position of the wheel unit during the revolution of the wheel, as well as the front right position AVD, rear right position ARD, front left position AVG and rear left position ARG of the wheel units A, B, C and D. This is because the wheel unit belongs to the wheel whose ABS sensor constantly identifies the same transmission position of the wheel unit on the wheel, the position of the ABS sensors 100, 200, 300 and 400 being fixed on the vehicle 1 and known by the central unit 2.

Thus the wheel unit determines the pair (ABS sensor and wheel unit) which indicates the same angular transmission position. This location method using ABS sensors is described in U.S. Pat. No. 6,112,587 in the name of the present applicant.

Figure 2A:
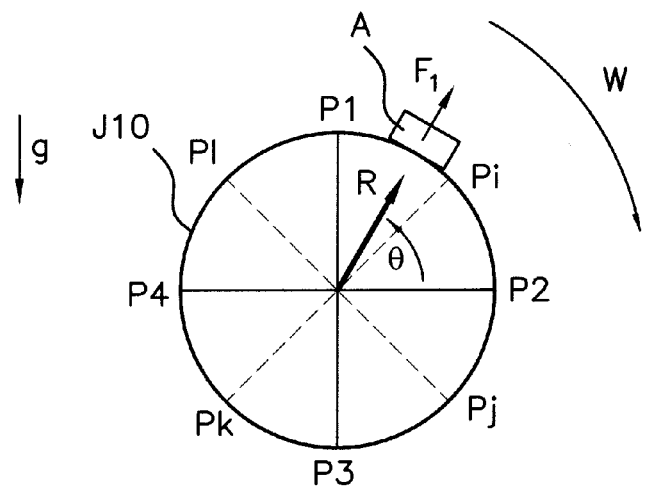

This method of wheel location is reliable and robust, but there is a major difficulty in ensuring that the wheel unit always transmits at the same position on the wheel. In order to determine this fixed transmission position, the radial acceleration sensor of the wheel unit measures the radial acceleration several times during one revolution of the wheel. This is illustrated in FIG. 2. In FIG. 2a, the wheel unit A positioned on the rim J10 of the wheel 10 includes an accelerometer (not shown) which measures the radial acceleration $F_1$ which it undergoes at various positions during a wheel revolution when the wheel revolves in the direction of rotation W, namely the positions Pi, P2, Pj, P3, Pk, P4, Pl. These measurements are preferably made at a fixed frequency.

Figure 3:
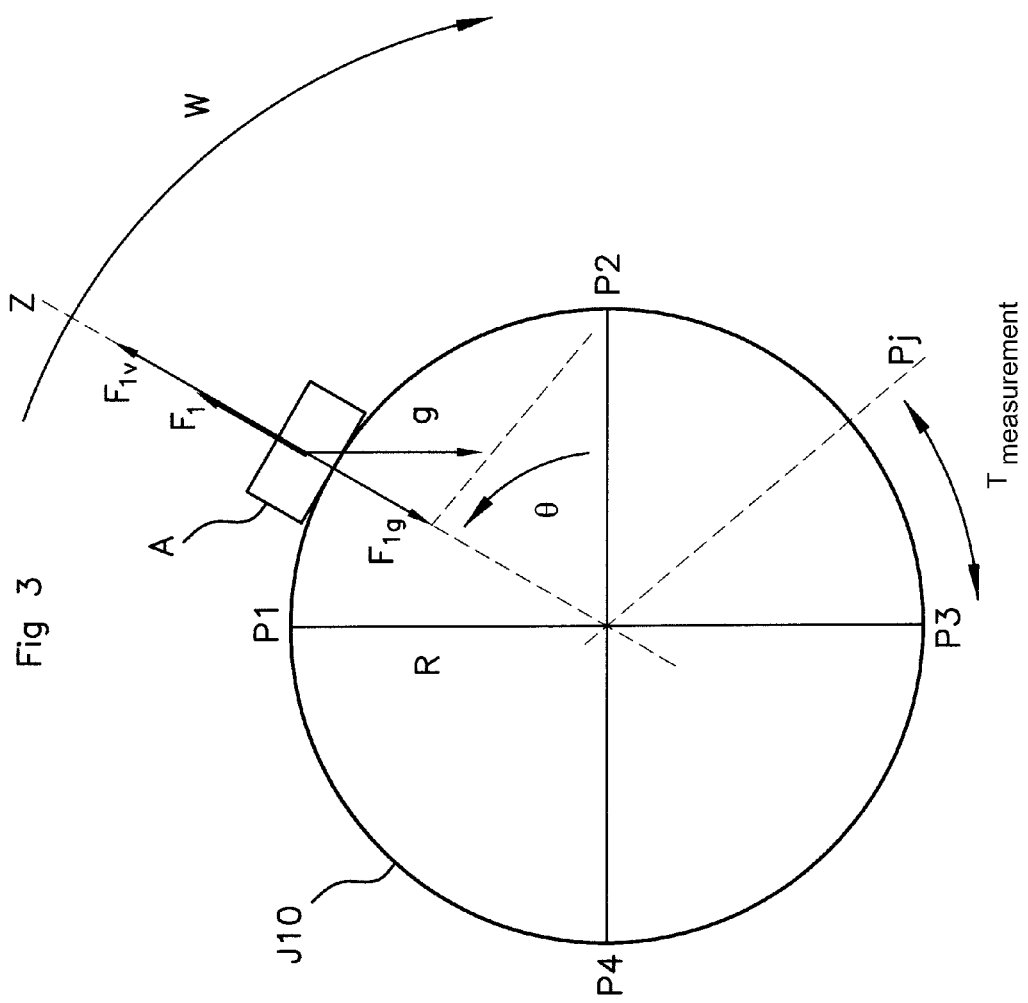

As shown in FIG. 3, the acceleration force $\vec{F}_1$ measured by the radial accelerometer of the wheel unit A is the resultant of two radial components, namely a force $\vec{F}_{1g}$, which is the projection of gravity g in the direction of measurement Z of the radial accelerometer, and a force $\vec{F}_{1v}$, which is the projection of the centrifugal force $\vec{F}_v$ in the same direction of measurement Z of the radial accelerometer A, as shown below:

$$\vec{F}_1 = \vec{F}_{1g} + \vec{F}_{1v}$$

It should be noted that the projection of the centrifugal force in the direction of measurement Z of the radial accelerometer is equal to the centrifugal force itself, since this direction of measurement Z is radial with respect to the wheel, and the centrifugal force is exerted radially at the wheel. Therefore, $$\vec{F}_{1v} = \vec{F}_v$$

The value of the projection of gravity in the direction of measurement of the radial accelerometer at the instant t is expressed as follows:

$$F_{1g}(t) = g \cdot \sin(w(t) \cdot t) \qquad (1)$$

where:
g represents the gravitational constant, which is a vertical downward vector with a value of $-9.81$ m/s$^2$,
w(t) is the angular rotation speed of the radial accelerometer at the instant t, and
t is the unit of time in seconds.

The value of the centrifugal force is expressed as follows:

$$F_v(t) = R \cdot w(t)^2 \qquad (2)$$

where R is the distance between the accelerometer and the axis of rotation of the wheel, in other words the radius of the rim.

Therefore, $$F_1(t) = g \cdot \sin(w(t) \cdot t) + R \cdot w(t)^2 \qquad (3)$$

and:

$$w(t) = \frac{v(t)}{R_P} \qquad (4)$$

where v(t) is the linear speed of the vehicle, $R_P$ being the radius of the wheel including the tire.

The curve of radial acceleration $F_1(t)$ as a function of time is therefore a sinusoid (see FIG. 2b) whose maximum MAX and minimum MIN points correspond, respectively, to the position of the accelerometer at the bottom of the rim in position P3 and at the top of the rim in position P1. Clearly, the minimum and maximum values of radial acceleration in positions P1 and P3 are not fixed, but depend on the rotation speed of the wheel, and therefore this minimum and maximum can only be determined locally at each wheel revolution, and not absolutely with respect to thresholds with fixed values.

A method of digital processing of these radial acceleration measurements by the wheel unit, not detailed here but known to those skilled in the art, can be used to determine the minimum value MIN of the radial acceleration and consequently the passage of the accelerometer through the position P1, and/or the maximum value MAX of radial acceleration and consequently the passage of the accelerometer through the position P3.

On the basis of these radial acceleration measurement data $F_1$, it is therefore possible, by using appropriate digital processing, to discover the passage of the wheel unit through the positions P1 and/or P3 on the wheel. On completion of this digital processing, the wheel unit 2 can then transmit a signal, at these determined fixed positions (or at slightly offset positions, due to the time taken by the digital processing, as explained below), to the central unit.

It should be noted that the processing of the radial acceleration measurements used to determine these positions is not immediate, and consequently there is a (processing) time between the determination of the transmission position and the transmission of the signal by the wheel unit. The fixed transmission position is therefore located immediately after each determined position, in the direction of rotation of the wheel.

Clearly, the accuracy of the determination of the fixed transmission position of the wheel unit can be improved, and the aforementioned digital processing time can be reduced, by multiplying the acceleration measurements; however, the life of the battery supplying the wheel unit will be shortened accordingly.

However, if a sufficiently long time interval is provided between two radial acceleration measurements to avoid unnecessary demand on the battery, this time interval may prove to be sufficient for making a minimum number of radial acceleration measurements over one wheel revolution at low rotation speed, or for wheels having a large rim radius, but it may be too long for high rotation speeds or for smaller rim radii. This is because, if this interval is too long, the number of radial acceleration measurements over one wheel revolution is insufficient to enable the minimum or maximum radial acceleration, in other words the fixed transmission positions of the wheel unit, to be determined rapidly (in other words over one wheel revolution) and reliably.

It is therefore inadvisable to fix a predetermined time interval between two successive acceleration measurements supplied by the radial accelerometer. This measurement time varies with the rotation speed of the wheel, and consequently with the speed of the vehicle, as well as with the radius of the wheel rim. This is because, as the radius decreases, the time required to complete a revolution of the wheel also decreases, and the measurements must therefore be closer together.

The object of the present invention is to overcome this drawback by calculating a time interval between two successive radial acceleration measurements which is adapted to the rotation speed of the wheel, in order to determine the fixed transmission position of the wheel unit on the wheel in a reliable and rapid manner. It should be noted that one of the objects of the invention, illustrated here, is to determine an absolute fixed position of the radial accelerometer (in other words, of the wheel unit) on the wheel, rather than a relative position.

The proposed invention relates to a method of sampling acceleration measurements of a wheel of a motor vehicle, said vehicle having a tire pressure monitoring system, and being fitted with an electronic central unit, each of said wheels including:

a wheel unit fixed to a rim of radius R and having at least one accelerometer, measuring the radial acceleration $F_1$ of the wheel, and a microprocessor, said method including the measurement, for each wheel revolution, at given time intervals ($T_{measurement}$), of a number (N) of radial acceleration values by the radial accelerometer, and the method according to the invention consists in:

fixing a minimum number (N) of acceleration measurements per wheel revolution, and determining the time intervals ($T_{measurement}$) between two radial acceleration measurements, by means of the following relation:

$$T_{measurement} = \frac{2\pi \cdot \sqrt{\frac{R}{F_1}}}{N}$$

In one embodiment, the accelerometer is a radial accelerometer.

In different embodiments, for a given rim radius (R), the number of acceleration measurements per wheel revolution (N) is fixed at 15, and for an estimated rim radius (R), the number of acceleration measurements per wheel revolution (N) is greater than 15.

The invention also proposes that the acceleration measurements be filtered by means of a high-pass and/or a low-pass filter, so as to eliminate measurements arising from parasitic noise and to eliminate the continuous component of the acceleration, in other words the centrifugal force $F_v(t) = R \cdot w(t)^2$, thereby improving the processing on the shape of the signal transmitted by the accelerometer, in other words on the curve representing the value of the projection of gravity in the direction of measurement of the radial accelerometer, i.e. $F_{1g}(t) = g \cdot \sin(w(t) \cdot t)$.

The invention also relates to the device for applying the acceleration measurement sampling method as described above.

Other objects, characteristics and advantages of the invention will be discovered by reading the following detailed description, provided by way of example and without restrictive intent, with reference to the attached drawings, in which:

FIG. 1, explained above, is a schematic representation of the tire pressure monitoring system of a vehicle fitted with an ABS system, according to the prior art, FIG. 2 (2a and 2b), explained above, illustrates the sampling of the radial acceleration measurements for the purpose of determining a fixed transmission position of the wheel unit, according to the prior art, FIG. 3, explained above, illustrates the resolution of forces acting on the radial accelerometer according to the prior art.

It is known that the value of the radial acceleration $F_1$ measured by the radial accelerometer is given by the equation $$F_1(t) = g \cdot \sin(w(t) \cdot t) + R \cdot w(t)^2 \quad (3)$$

Since the expression $g \cdot \sin(w(t) \cdot t)$ of the formula (3) varies from $+9.81$ to $-9.81$ m/s², because $\sin(w(t) \cdot t)$ varies from $-1$ to $+1$, the invention proposes that the value of this expression be disregarded in favor of the centrifugal force which, for its part, is proportional to the square of the linear speed of the vehicle. Expression (3) may therefore be simplified to:

$$F_1(t) = R \cdot w(t)^2 \quad (5)$$

During one wheel revolution, the angular speed is calculated by:

$$w = \frac{2 \cdot \pi}{T} \quad (6)$$

where T is equal to the time for completing one wheel revolution.

Expression (6) then becomes:

$$\frac{2 \cdot \pi}{T} = \sqrt{\frac{F_1}{R}}$$

where $F_1$ is the value of the acceleration measured by the radial accelerometer A over one wheel revolution.

The time T required to complete one wheel revolution becomes:

$$T = 2 \cdot \pi \cdot \sqrt{\frac{R}{F_1}}$$

Thus the time T taken for one wheel revolution is given as a function of the value of acceleration $F_1$ for one wheel revolution, measured by the radial accelerometer, and also as a function of the radius of the rim R.

According to the invention, if N acceleration measurements are to be performed per wheel revolution, the time interval $T_{measurement}$ between two measurements will therefore be:

$$T_{measurement} = \frac{2 \cdot \pi \cdot \sqrt{\frac{R}{F_1}}}{N} \quad (7)$$

Thus, owing to the invention, it is possible, after the number of radial acceleration measurements N has been fixed, to determine the time between two radial acceleration measurements according to the rim radius of the wheel R and according to the speed of the wheel (in other words, according to the radial acceleration $F_1$).

The advantage of the invention is therefore that the time interval between two measurements $T_{measurement}$ can be varied, for example between the positions Pj and P3 (see FIG. 3), as a function of the external conditions such as the radius of the rim R or the vehicle speed. The method of sampling acceleration measurements can be used to maintain a predetermined number N which is considered to be sufficient to find, on each wheel revolution, the maximum value MAX and the minimum value MIN of radial acceleration, such that the wheel unit can always transmit at the same fixed position on the wheel.

Clearly, the radial acceleration measurements may be filtered (with a high-pass or low-pass filter) to avoid parasitic measurements caused, for example, by the sudden slipping of a tire, by vibrations caused by the wheel surface, or by vibrations caused by the wheel axle.

Figure 2B:
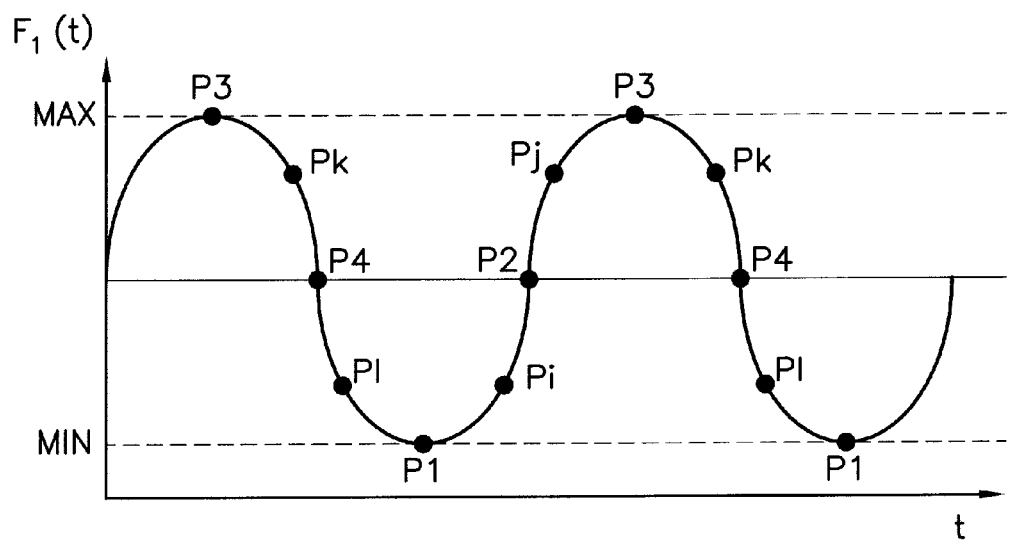

Looking at FIG. 2b, it may appear that four radial acceleration measurements per wheel revolution would be sufficient to determine the maximum and minimum values of radial acceleration, in other words the positions P1 and P3. However, it is evidently impossible to determine these values by measuring the radial acceleration, for example, only at positions Pi, Pj, Pk and Pl. Furthermore, FIG. 2b has been simplified with the aim of explaining the invention, and the actual curve representing the radial acceleration measurements over one wheel revolution is affected by noise and includes a number of local maxima and minima which must be distinguished from the absolute minimum and maximum which truly correspond to the positions P1 and P3. The number of radial acceleration measurements required to determine the positions P1 and P3 is therefore generally greater than four.

In our example, for a rim radius of 15 inches and a wheel rotation frequency of 3 to 20 Hz, the number N of acceleration measurements is fixed at 15. For a rim radius which is estimated and not known, the number of acceleration measurements N is greater than 15. Clearly, for a type of vehicle sold with more than one possible rim radius, the digital processing is designed to tolerate variations in the number of radial acceleration measurements N (in other words the number of samples) per wheel revolution, which may be as much as 30% (in other words, N may be equal to 10 instead of 15).

The determination of N is crucial. It may be empirical, or may depend on the capacity for processing the signal from the wheel unit; this is because, since the wheel unit must be able to determine rapidly the position(s) corresponding to the maximum and/or to the minimum of the radial acceleration, the quantity of data, in other words the number of acceleration measurements N to be processed, must be limited.

Clearly, the invention is not limited to the embodiment described and illustrated, which has been provided solely by way of example. In our example, the purpose of the sampling method is to determine a fixed transmission position of the wheel unit, but it may also be used to determine other parameters.

The invention claimed is:

1. A method of sampling acceleration measurements of a wheel (10, 20, 30, 40) of a motor vehicle (1), said vehicle (1) having a tire pressure monitoring system and being fitted with an electronic central unit (2), each of said wheels (10, 20, 30, 40) including:
a wheel unit (A, B, C, D) fixed to a rim (J10, J20, J30, J40) of radius R and having at least one accelerometer, measuring the radial acceleration $F_1$ of the wheel, and a microprocessor,
said method comprising:
measuring, for each wheel revolution, at given time intervals ($T_{measurement}$), a number (N) of radial acceleration values by the accelerometer;
fixing a minimum number (N) of acceleration measurements per wheel revolution;
determining the time intervals ($T_{measurement}$) between two radial acceleration measurements, using the following relation:

$$T_{measurement} = \frac{2\pi \cdot \sqrt{\frac{R}{F_1}}}{N};$$

instructing the accelerometer to make the radial acceleration measurements at the determined time intervals ($T_{measurement}$); and
the wheel unit receiving and processing the radial acceleration measurements and sending the processed radial acceleration measurements to the electronic central unit.

2. The location method as claimed in claim 1, wherein the accelerometer is a radial accelerometer.

3. The location method as claimed in claim 1, wherein, for a given rim radius (R), the number of acceleration measurements per wheel revolution (N) is fixed at 15.

4. The location method as claimed in claim 1, wherein, for an estimated rim radius (R), the number of acceleration measurements per wheel revolution (N) is greater than 15.

5. The location method as claimed in claim 1, wherein the acceleration measurements are filtered, by a high-pass and/or a low-pass filter, in order to eliminate the measurements caused by parasitic noise.

6. A device for sampling acceleration measurements of a wheel (10, 20, 30, 40) of a motor vehicle (1), said vehicle (1) having a tire pressure monitoring system, and being fitted with an electronic central unit (2), each of said wheels including:
a wheel unit (A, B, C, D) fixed to a rim (J10, J20, J30, J40) of radius R and having at least one accelerometer, measuring radial acceleration $F_1$ of the wheel, and a microprocessor,
the accelerometer being configured to measure, for each wheel revolution, at given time intervals ($T_{measurement}$), a number (N) of radial acceleration values by the accelerometer;
said device comprising:
means for fixing a minimum number (N) of acceleration measurements per wheel revolution; and
means for determining time intervals ($T_{measurement}$) between two radial acceleration measurements, using the following relation:

$$T_{measurement} = \frac{2\pi \cdot \sqrt{\frac{R}{F_1}}}{N};$$

wherein the accelerometer makes the radial acceleration measurements at the determined time intervals ($T_{measurement}$) from the means for determining time intervals; and
wherein the wheel unit receives and processes the radial acceleration measurements from the accelerometer and sends the processed radial acceleration measurements to the electronic central unit.

7. The location method as claimed in claim 2, wherein, for a given rim radius (R), the number of acceleration measurements per wheel revolution (N) is fixed at 15.

8. The location method as claimed in claim 2, wherein, for an estimated rim radius (R), the number of acceleration measurements per wheel revolution (N) is greater than 15.

9. The location method as claimed in claim 2, wherein the acceleration measurements are filtered, by a high-pass and/or a low-pass filter, in order to eliminate the measurements caused by parasitic noise.

10. The location method as claimed in claim 3, wherein the acceleration measurements are filtered, by a high-pass and/or a low-pass filter, in order to eliminate the measurements caused by parasitic noise.

11. The location method as claimed in claim 4, wherein the acceleration measurements are filtered, by a high-pass and/or a low-pass filter, in order to eliminate the measurements caused by parasitic noise.

* * * * *